United States Patent
Wang et al.

(10) Patent No.: US 7,743,243 B2
(45) Date of Patent: Jun. 22, 2010

(54) SYSTEM AND METHOD TO ENABLE TEAMED NETWORK ENVIRONMENTS DURING NETWORK BASED INITIALIZATION SEQUENCES

(75) Inventors: Lei Wang, Austin, TX (US); Wei Liu, Austin, TX (US); Weimin Pan, Austin, TX (US); Jianwen Yin, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 670 days.

(21) Appl. No.: 11/674,722

(22) Filed: Feb. 14, 2007

(65) Prior Publication Data

US 2008/0195796 A1 Aug. 14, 2008

(51) Int. Cl.
*G06F 9/00* (2006.01)
*G06F 15/177* (2006.01)
*G06F 13/00* (2006.01)

(52) U.S. Cl. .............................. 713/2; 713/1; 710/104; 710/302

(58) Field of Classification Search ...................... 713/1, 713/2; 710/104, 302
See application file for complete search history.

(56) References Cited

U.S. PATENT DOCUMENTS

| | | | | |
|---|---|---|---|---|
| 6,324,644 | B1 * | 11/2001 | Rakavy et al. | 713/1 |
| 6,463,530 | B1 * | 10/2002 | Sposato | 713/2 |
| 6,532,537 | B1 * | 3/2003 | Chen et al. | 713/2 |
| 2004/0193863 | A1 * | 9/2004 | Zimmer et al. | 713/1 |
| 2005/0149716 | A1 * | 7/2005 | Nair et al. | 713/1 |
| 2006/0010316 | A1 * | 1/2006 | Burokas et al. | 713/2 |
| 2006/0150239 | A1 * | 7/2006 | Fujimori et al. | 726/3 |
| 2008/0040525 | A1 * | 2/2008 | Lin et al. | 710/302 |

OTHER PUBLICATIONS

U.S. Appl. No. 11/563,024, filed on Nov. 23, 2006.

* cited by examiner

*Primary Examiner*—Vincent T Tran
(74) *Attorney, Agent, or Firm*—Larson Newman & Abel, LLP

(57) ABSTRACT

A system and method to enable teamed network environments during network based initialization sequences is disclosed. In one form of the disclosure, an information handling system can include a plurality of communication modules. One of the communication modules can be used to store a first teaming application. The information handling system can also include a processor configured to execute the first teaming application to provide a teamed network environment using the plurality of communication modules to load an operating system during a pre-boot initialization.

17 Claims, 3 Drawing Sheets

SYSTEM AND METHOD TO ENABLE TEAMED NETWORK ENVIRONMENTS DURING NETWORK BASED INITIALIZATION SEQUENCES

FIELD OF THE DISCLOSURE

This disclosure relates generally to information handling systems, and more particularly to a system and method to enable teamed network environments during network based initialization sequences.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Various information handling systems can be realized as servers that can be mounted within server racks. Servers can allow for accessing and serving information, applications, and various types of data to multiple clients via an Intranet, the Internet, or combinations thereof. The complexity and density of servers and associated components for some enterprise data centers impacts environmental and operating conditions of servers within data centers, and initialization routines of servers and systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
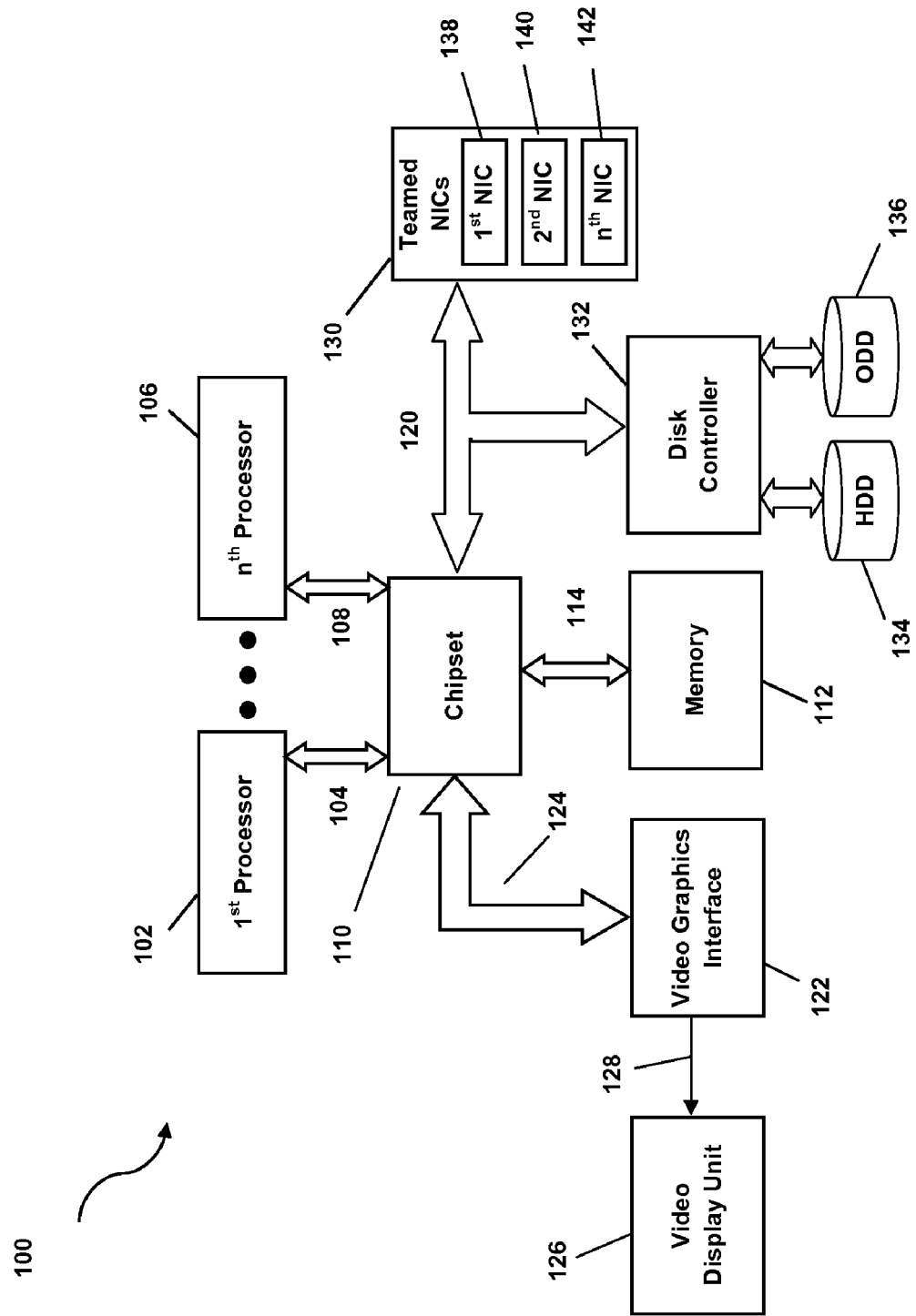
FIG. 1 illustrates a block diagram of an information handling system according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

According to one aspect of the disclosure, a method can include accessing a first teaming application prior to loading a portion of an operating system and initiating a teamed network environment using the first teaming application. The method can also include loading the portion of the operating system stored from a remote location using the teamed network environment.

According to another aspect of the disclosure, an information handling system can include a plurality of communication modules. One of the communication modules can be used to store a first teaming application. The information handling system can also include a processor configured to execute the first teaming application to provide a teamed network environment using the plurality of communication modules to load an operating system during a pre-boot initialization.

According to a further aspect of the disclosure, an application module is provided. The application module can include an encoded logic operable to be accessed prior to execution of a primary teaming application. The encoded logic can also include a secondary teaming application operable to enable a teamed network environment to access an operating system including the primary teaming application during a pre-boot initialization.

FIG. 1 illustrates a block diagram of an exemplary embodiment of an information handling system, generally designated at 100. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include a dedicated bus to transfer data between first physical processor 102 and the $n^{th}$ physical processor 106. For example, the chipset 110 including a chipset that can include a memory controller hub and an input/output (I/O) controller hub. As a memory controller hub, the chipset 110 can function to provide access to the first physical processor 102 using first bus 104 and the $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can include an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, an Intel 975X chipset, an Intel G965 chipset, available from the Intel Corporation of Santa Clara, Calif., or any combination thereof, can provide at least a portion of the chipset 110. The chipset 110 can also be packaged as an application specific integrated circuit (ASIC).

In one form, the chipset 110 can be coupled to a video graphics interface 122 using a third bus 124. In one form, the video graphics interface 122 can be a Peripheral Component Interconnect (PCI) Express interface operable to provide content to display within a video display unit 126. Other graphics interfaces may also be used. The video graphics interface 122 can provide a video display output 128 to the video display unit 126. The video display unit 126 can include one or more types of video displays such as a flat panel display (FPD), cathode ray tube display (CRT) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a PCI bus or a high speed PCI-Express bus. In one embodiment, a PCI bus can be operated at approximately 66 MHz and a PCI-Express bus can be operated at more than one (1) speed (e.g. 2.5 GHz and 5 GHz). PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Internet SCSI (iSCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

The information handling system 100 can also include a plurality of network devices, communication modules, network interface cards, or other communication devices that can be used within a teamed network environment 130. For example, the teamed network environment 130 can include a first network interface card (NIC) 132, a second NIC 140, an $n^{th}$ NIC 142, or any combination thereof. Each NIC can include an 802.3ad standard compliant module that can be operable to employ static and dynamic teaming operating modes to provide the teamed network environment 130. In one form, a static teaming operating mode can include employing a fixed number of NICs while a dynamic teaming operating mode can include adding or removing one or more NIC to a teamed network environment 130. The teamed network environment 130 can also provide load balancing and redundancy to the information handling system 100.

In one form, the teamed network environment 130 allows for combining physical communication channels into a single logical channel for the information handling system 100. For example, the information handling system 100 can access one or more external resources such as external hard drives, redundant array of independent disks (RAIDs), just a bunch of disks (JBODs), small computer system interface (SCSI) enabled drives, iSCSI enabled drives, serial attach SCSI (SAS) enabled drives, serial attached ATA (SATA) enabled drives, or various other resources, or combinations thereof. In one embodiment, the teamed network environment 130 can allow for a point-to-point serial peripheral communication interface in which NICs can be linked directly to storage devices.

In one embodiment, the teamed network environment 130 can include an iSCSI-enabled network environment that employs an Internet protocol (IP)-based storage networking standard for linking data storage devices and facilities. The teamed network environment 130 including the iSCSI-enabled network environment allows for carrying SCSI commands over IP networks, and can be used to facilitate data transfers to manage storage over long distances. In one form, an iSCSI protocol can be used in association with a storage area network (SAN), and can increase the capabilities and performance of storage data communication. The teamed network environment 130 employing iSCSI can be used to transmit data over local area networks (LANs), wide area networks (WANs), or the Internet and can enable location-independent data storage and retrieval. In other forms, the teamed network environment 130 can employ other types of data transmission and storage data transmission including, but not limited to, using Fibre Channel over IP (FCIP) to access geographically distant Fibre Channel SANs. FCIP can be used in conjunction with Fibre Channel technology.

During use, the information handling system 100 can be initialized using a BIOS loaded within a non-volatile memory. For example, the BIOS can be used during a pre-boot initialization sequence and can be used as an interface to operate various hardware devices. The BIOS can also access hardware connected to the information handling system 100 to determine an operating condition as power is applied to the information handling system 100. In one form, the BIOS can access a ROM device or other memory device located within one or more of the NICs 132, 140, 142. For example, a memory of the first NIC 132 can provide a secondary teaming application that can be loaded within a portion of the memory 104 during initialization of the information handling system 100. In one form, the secondary teaming application can be loaded within a shadow memory portion (e.g., C000:0000h to E000:FFFFh) of the memory 104 and executed using an interrupt vector table and associated commands and functions. The secondary teaming application can be executed to enable the teamed network environment 130. In this manner, the teamed network environment 130 can be employed to access a boot image or operating system that can be loaded into the memory 104 and executed by the information handling system 100 to provide an operating system.

Figure 2:
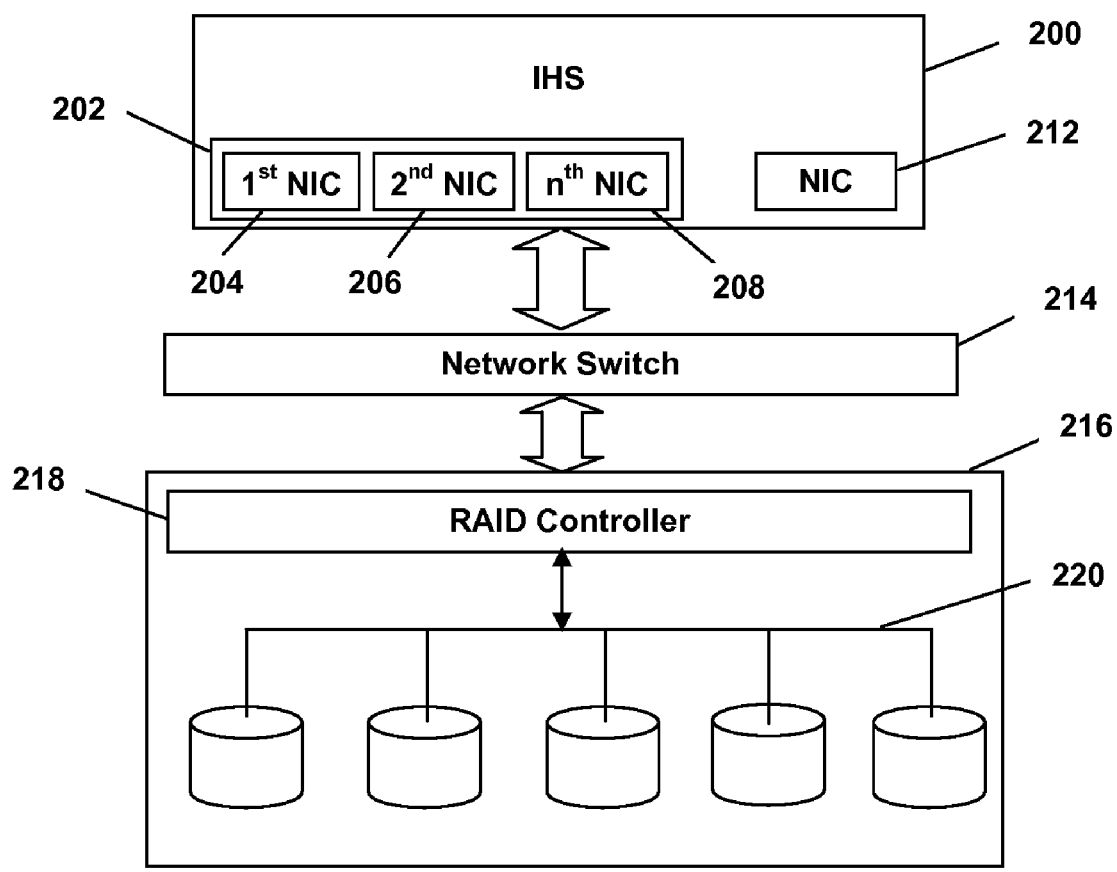
FIG. 2 illustrates a functional diagram of an information handling system employing teamed communication modules according to one aspect of the disclosure.

FIG. 2 illustrates one form of an information handling system 200 employing a teamed network environment 202 operable to be used during a pre-boot initialization sequence of the information handling system 200. The teamed network environment 202 can include a first NIC 204, a second NIC 206, and an $n^{th}$ NIC 208. The information handling system 200 can also include a non-teamed NIC 212 operable to be used outside of the teamed network environment 202. In one form, each NIC may be operable as a communication module or device operable to communicate with one or more networks such as an Intranet or the Internet. In one form, each NIC can include an 802.3ad compliant communication module operable to employ static and dynamic teaming modes to provide the teamed network environment 202. Other type of NICs or communication modules can also be employed. The teamed network environment 202 allows for combining physical communication channels into a single logical channel for the information handling system 200.

The information handling system 200 can be coupled to a network switch 214 that can be configured to be used in association with the teamed network environment 202 to access one or more location such as an external storage device such as a RAID array 216. The RAID array can include a RAID controller 218 operable to provide access to storage disks 220. Other types of storage devices can also be accessed. In one form, communication with the RAID controller 218 and the information handling system 200 can include an iSCSI enabled RAID array 216. In other forms, a single remote storage device or other storage devices, information sources, etc. can be accessed using the network switch 214.

According to one aspect, a boot image that includes an operating system can be stored within a remote storage device, such as one or more remote storage devices 220, and accessed by the information handling system 200 to load the operating system during a pre-boot initialization. Additionally, the first NIC 204, or other NIC, can include a memory device that includes a teaming application that can be used by the information handling system 200 during the pre-boot initialization sequence. In one form, the memory device can include an application module including the teaming application that can be used during the pre-boot initialization sequence. For example, the first NIC 204 can include an optional read only memory (ROM) operable to be read into system memory during a pre-boot initialization sequence. In other forms, a NIC can include a reference to programmable storage device, such as an EEPROM, storing the teaming application. The IHS 200 can include a BIOS configured to read the teaming application stored in the memory of the first NIC 204. The teaming application can then be executed by the IHS 200, and the teamed network environment 202 can be provided.

According to another aspect, the IHS 200 can employ iSCSI to access a boot image stored in a remote storage device or an iSCSI enabled RAID array 216. For example, an iSCSI operation can be employed during the boot sequence to access a boot image stored with the iSCSI enabled RAID array 216. The IHS 200 can employ a teaming application to provide the teamed network environment 202 during initialization of the IHS 200. In this manner, the teamed network environment 202 can provide an increase in bandwidth to access a boot image storage within an iSCSI-enabled RAID array 216 can be realized prior to loading primary teaming network application associated with the boot image.

Figure 3:
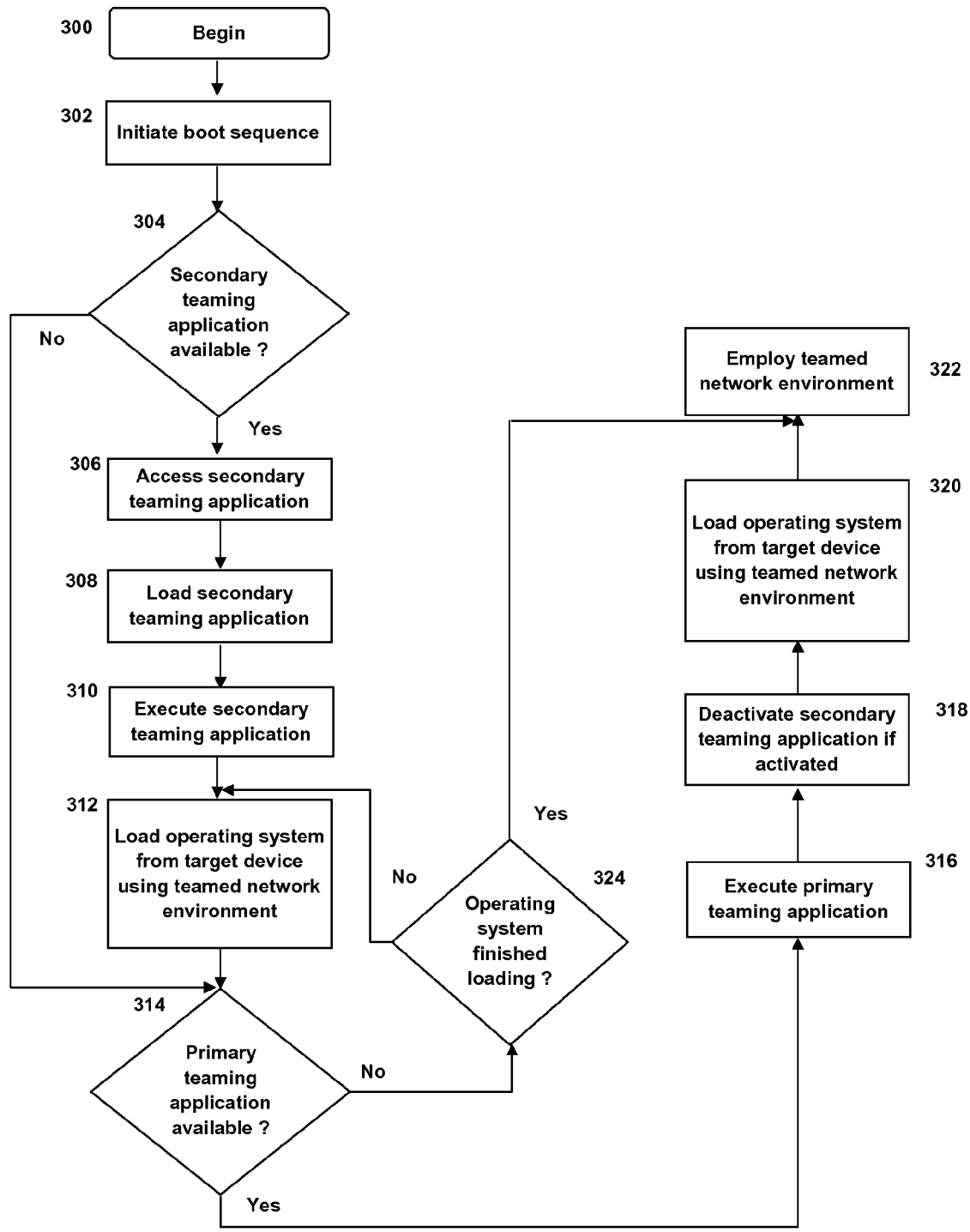
FIG. 3 illustrates of a flow diagram of a method of maintaining a teamed network environment according to another aspect of the disclosure.

FIG. 3 illustrates of a flow diagram of a method of maintaining a teamed network environment according to another aspect of the disclosure. The method of FIG. 3 can be employed in whole, or in part, by the information handling system 100 depicted in FIG. 1, the system 200 illustrated in FIG. 2, or any other type of system, controller, device, module, application module, or any combination thereof, operable to employ all, or portions of, the method of FIG. 3. Additionally, the method can be embodied in various types of encoded logic including software, firmware, hardware, or other forms of digital storage mediums, computer readable mediums, or logic, or any combination thereof, operable to provide all, or portions, of the method of FIG. 3.

The method begins generally at 300. At block 302 a pre-boot initialization sequence can be used to initialize various portions of an information handling system. According to one aspect, an information handling system can include a boot image stored within one or more storage device accessible by an information handling system during an initialization sequence. A boot image can include an operating system that can be loaded in the memory of an information handling system and executed to provide an operating environment. In one aspect, an operating system initiator or OS initiator can be used to initialize an information handling system and load various portions of software, firmware, modules, applications, drivers, etc. that can be used to operate an information handling system. According to another aspect, a communication module can include a memory device, such as an optional read only memory (ROM) device or other type of memory that can include an application to be loaded during an initialization sequence. In one form, the NIC can include iSCSI firmware stored within a memory device of the NIC.

At step 304, if a secondary teaming application is not available, the method can proceed to decision block 314 as described below. If at block 304, a secondary teaming application is available, the method proceeds to block 306 and accesses the secondary teaming application. According to one aspect, one or more network communication module or devices can be accessed to determine if a secondary teaming application may be available. In one form, a communication module such as a NIC can include an optional ROM that can be accessed. In one form, an information handling system's BIOS can access the optional ROM and load the contents within a memory location of the information handling system. The contents of the optional ROM can include a teaming application that can be executed during a pre-boot initialization sequence.

Upon accessing the secondary teaming application, the method can proceed to block 308 and load the secondary teaming application into memory of the information handling system. For example, the teaming application can be loaded into shadow memory of the information handling system. In one form, shadow memory can include memory that is typically not accessed by an operating system during normal operation or execution of the operating system. A system BIOS can use the shadow memory to load the secondary teaming application and the method can proceed to block 310 and execute the secondary teaming application. For example, the teaming application can determine the number of available network communication modules that can be used by the information handling system and employ the network communication modules to load a portion or all of an operating system from a target device. In one form, the teaming application can be provided as iSCSI firmware that can be initiated to establish a teamed network environment and connect to an iSCSI target device. For example, a target device can include an iSCSI enabled storage device storing a boot image that includes an operating system and associated modules, drivers, etc. that can be used by an information handling system. According to another aspect, multiple storage devices can be used to store portions of an operating system and can be accessed by the information handling system employing the secondary teaming application.

The method can then proceed to block 312 and initiate loading an operating system from a target device using the teamed network environment. For example, a systems BIOS can load the operating system boot sector from a target disk drive. Upon loading a portion of the operating system, the method can proceed to block 314 and determine if a primary teaming application has been loaded in association with loading the operating system. For example, an operating system can include a primary teaming application that can be loaded during initialization of an information handling system as a part of an OS or boot image load. If the primary teaming application is not loaded, the method proceeds to block 324 and determines if the operating system has finished loading. If the operating system has not finished loading, the method proceeds to block 314. If the operating system has finished loading, the method proceeds to block 322.

If at decision block 314, a primary teaming application has been loaded, the method can proceed to block 316 and execute the primary teaming application. For example, the primary teaming application can be similar or the same as the secondary application and can be loaded into primary memory of the information handling system and executed. Upon executing the primary teaming application, the method can proceed to block 318 and the secondary teaming application can be deactivated if the primary teaming application has been activated. For example, the primary teaming application can take control of the memory locations or OS boot stack used for loading the operating system via the teamed network environment. In one form, if shadow memory or other memory locations are used by the secondary teaming application, the BIOS or an associated process can release the memory locations, and any associated interrupt functions employed in association with using the secondary teaming application.

Upon deactivating the secondary teaming application, the method can proceed to block 320, and the operating system can be loaded from the target device using the teamed network environment and the primary teaming application. The method can then proceed to block 322, and the teamed network environment can be used by the information handling system as desired. In this manner, the method of FIG. 3 can allow for employing a secondary teaming application during an initialization sequence prior to an operating system being loaded and executed, allowing for efficient and shorter OS load times. Additionally, transitioning between a primary and secondary teaming application for enabling teamed network operating environments can also be provided.

In the appended claims, the terms "first", "second", "third", etc. are only used for labeling convenience, and such terms are not to imply an ordering, a relative importance, a relative preference, other suitable comparison, or any combination thereof with respect to the articles that they modify. The terms "primary", "secondary", "tertiary", etc. may or may not refer to an ordering, a relative importance, a relative preference, other suitable comparison, or any combination thereof with respect to the articles that they modify. Thus, the term "a first teaming application" as used in the claims may refer to "a primary teaming application" or "a secondary teaming application" as described above or used in the figures.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    accessing a first teaming application stored within a memory of a first communication module prior to loading an operating system, wherein accessing the first teaming application includes accessing an interrupt command using an interrupt vector table;
    loading the first teaming application from the memory into a shadow memory portion of a system memory;
    initiating a teamed network environment using the first teaming application;
    loading a first portion of the operating system from a remote storage device using the teamed network environment;
    loading a second teaming application;
    executing the second teaming application;
    releasing the interrupt vector table and the shadow memory; and
    using the second teaming application to load a second portion of the operating system.

2. The method of claim 1, further comprising:
    initiating the second teaming application;
    utilizing the second teaming application to load a third portion of the operating system;
    disabling use the first teaming application; and wherein the loading the second portion of the operating system includes loading the second portion of the operating system from the remote storage device.

3. The method of claim 1, further comprising:
determining the first teaming application is not located within the first communication module;
determining the first teaming application is located within a second communication module; and
loading the first teaming application from the second communication module into a system memory.

4. The method of claim 1, further comprising:
executing the first teaming application;
executing the second teaming application loaded in association with the first portion of the operating system;
disabling executing of the first teaming application upon executing the second teaming application; and
wherein loading the first portion of the operating system includes loading the first portion of the operating system using the teamed network environment that includes the first communication module and the second communication module from an Internet small computer system interface (iSCSI)-enabled storage device.

5. The method of claim 1, further comprising:
accessing the first teaming application stored within the first communication module;
executing the first teaming application during a pre-boot initialization sequence of a system;
accessing the operating system stored within the remote storage device using the teamed network environment during the pre-boot initialization sequence; and
wherein loading the first portion of the operating system includes loading the first portion of the operating system during the pre-boot initialization sequence.

6. The method of claim 5, further comprising:
detecting whether the second teaming application is not loaded within a memory; and
continuing use of the first teaming application in response to the second teaming application not being loaded within the memory.

7. An information handling system comprising:
a plurality of communication modules including a first communication module having a memory including a first teaming application;
a remote storage device including a second teaming application; and
a processor configured to:
execute the first teaming application to provide a teamed network environment using the plurality of communication modules to load a first portion of an operating system from the remote storage device during a pre-boot initialization;
load the second teaming application;
execute the second teaming application; and
disable executing of the first teaming application upon executing the second teaming application;
wherein loading the first portion of the operating system includes loading the first portion of the operating system using the teamed network environment that includes the first communication module and a second communication module from an Internet small computer system interface (iSCSI)-enabled storage device.

8. The information handling system of claim 7, wherein the plurality of communication modules include at least one communication module including an option read only memory (ROM) storing the first teaming application.

9. The information handling system of claim 8, wherein:
the remote storage device includes an iSCSI-enabled remote storage device storing the operating system; and
the processor is further configured to initiate the teamed network environment using the second teaming application stored within the remote storage device and operable to be executed by the processor to provide the teamed network environment.

10. The information handling system of claim 8, further comprising:
a pre-boot sequence configured to access, the option ROM, the pre-boot sequence operable to initiate the use of the first teaming application; and
an operating mode operable to disable the first teaming application upon loading the first operating system from the remote storage device.

11. The information handling system of claim 10, further comprising an iSCSI storage device array including a boot image operable to be accessed during execution of the first teaming application and the second teaming application using the processor.

12. The information handling system of claim 7, further comprising:
a first communication module that does not include the first teaming application;
a second communication module having a memory including the first teaming application; and
wherein the processor is configured to detect the first teaming application stored within the second communication module during the pre-boot initialization.

13. Machine-executable code for an information handling system comprising a first resource, wherein the machine-executable code is embedded within a non-transitory computer readable medium and includes instructions for carrying out a method comprising:
accessing a first teaming application stored within a first communication module prior to loading an operating system;
executing the first teaming application during a pre-boot initialization sequence of a system;
initiating a teamed network environment using the first teaming application;
accessing an operating system stored within a remote storage device using a teamed network environment during the pre-boot initialization sequence;
loading a first portion of the operating system from the remote storage device using the teamed network environment;
detecting whether a second teaming application is not loaded within a memory; and
continuing use of the first teaming application in response to the second teaming application not being loaded within the memory.

14. The machine-executable code of claim 13, the method further comprising:
initiating the second teaming application;
utilizing the second teaming application to load a second portion of the operating system; and
disabling use the first teaming application; and
wherein the loading the second portion of the operating system includes loading the second portion of the operating system from the remote storage device.

15. The machine-executable code of claim 13, the method further comprising:
determining the first teaming application is not located within the first communication module;

determining the first teaming application is located within a second communication module; and loading the first teaming application from the second communication module into a system memory.

16. The machine-executable code of claim 13, the method further comprising:

executing the second teaming application loaded in association with the first portion of the operating system;

wherein loading the first portion of the operating system includes loading the first portion of the operating system using the teamed network environment that includes the first communication module and the second communication module from an Internet small computer system interface (iSCSI)-enabled storage device.

17. The machine-executable code of claim 13, the method further comprising:

detecting whether the second teaming application is not loaded within a memory; and continuing use of the first teaming application in response to the second teaming application not being loaded within the memory.

* * * * *